Oct. 18, 1927.

M. S. LOWER 1,645,604

METHOD OF MAKING COMPOUND SPONGE RUBBER AND FABRIC ARTICLES

Filed March 3, 1927

INVENTOR.
MELVIN S. LOWER
BY
Ely & Barrow
ATTORNEYS

Patented Oct. 18, 1927.

1,645,604

UNITED STATES PATENT OFFICE.

MELVIN S. LOWER, OF BARBERTON, OHIO, ASSIGNOR TO THE SUN RUBBER COMPANY, OF BARBERTON, OHIO, A CORPORATION OF OHIO.

METHOD OF MAKING COMPOUND SPONGE RUBBER AND FABRIC ARTICLES.

Application filed March 3, 1927. Serial No. 172,405.

This invention relates to the manufacture of fabric covered rubber articles, particularly articles made of sponge rubber with a felt or ornamental fabric covering. The object of the invention is to manufacture an article having tapered or feathered edges or other irregular shapes, and to insure an even stretched covering of fabric over the rubber to present a neat and attractive article. In the particular embodiment which is illustrated here, the invention is shown as applied to the manufacture of chair pads, although it may be applied to the manufacture of other articles as well. The chair pad or other article which is to be made by this process is superior to fabric covered articles of this nature made by other processes, as the fabric is stretched about its entire surface so that a smooth and even application of the fabric is attained without special attention on the part of the manufacturer.

In prior processes attempts have been made to secure an even application and stretching of the fabric covering on sponge rubber articles by stretching the beveled or tapered edge portions only. The present invention has for its object the stretching of the fabric covering about the entire surface of the article thus securing more perfect manufacture and better quality of workmanship. In addition the process does not require special equipment but may be carried out with less expense than prior processes.

In the drawings in which the best known method of practicing the invention is illustrated:

Figure 1:
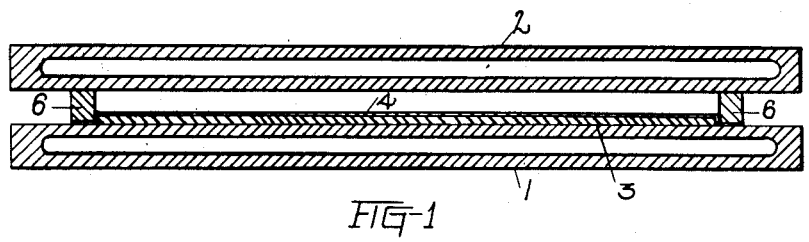
Figure 1 is a cross sectional view of two heated press plates with the article placed therein ready for vulcanization.

In the drawings 1 represents the lower platen and 2 the upper platen of a heated vulcanizing press, both of which platens are fabric-covered for the escape of gases generated during the curing operation. In order to manufacture the cushion or other article, a slab of uncured rubber 3, preferably of a composition which will expand in heating to form sponge rubber, is cut to the proper size and shape and over one surface is laid the fabric covering 4 which is to be secured to the article. This may be felt, velour, canvas or other fabric or covering material which will stretch. In this process it is not necessary or advisable to treat the surface with a solvent or kerosene before the application of the fabric covering.

The fabric covering is somewhat larger than the body of the rubber and projects outwardly therefrom about the entire circumference of the article.

The compound sheet as shown in Figure 1 is laid upon the platen 1 with the fabric covering upwardly, and about the slab of rubber is placed a frame 6 which is the shape of the article to be formed. By this process the use of all molds is avoided, thus simplifying and reducing the cost of the operations.

Figure 2:
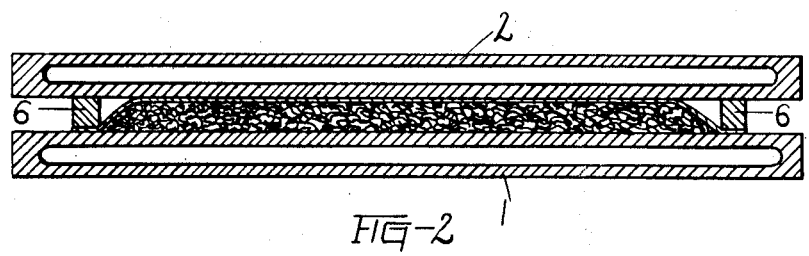
Figure 2 is a similar view showing the article as vulcanized.
Figure 3:
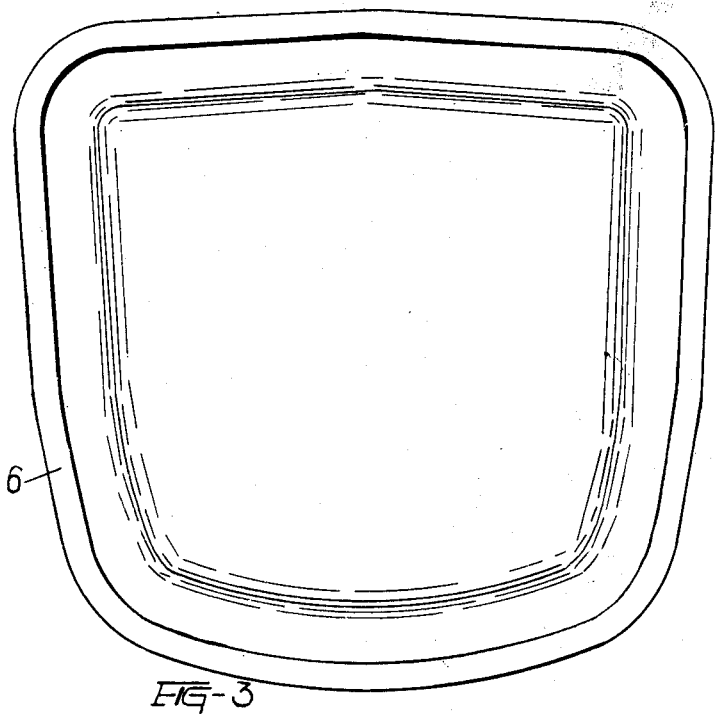
Figure 3 is a plan of the article with the edges untrimmed.

The platens 1 and 2 are brought together by hydraulic or other pressure which serves to clamp the edges of the sheet of covering material. The article is retained in the mold for a sufficient time to cure. When the stock is vulcanized it will expand to several times its original volume. This action is illustrated in Figure 2 in which the expanded sponge rubber is shown filling the space between the platens except about the edges. It will be seen that the expansion of the rubber, due to the fact that the fabric is spaced from the platen about its entire surface, will stretch the whole extent of the covering fabric and smoothly apply it to the sponge rubber, which will soften and adhere by the heat and during the process of vulcanization.

Figure 4:
Figure 4 is a cross section of the finished article.

The article which is obtained is removed from the mold and the edges trimmed, presenting the perfected article shown in Figure 4 in which the fabric is stretched about the entire surface 8 and upon the edges. No rubber will escape during vulcanization and the fabric only is required to be trimmed from about the edges. The edges 10 will acquire the smooth and even curvature imparted by the expansion of the rubber material and will not be confined by a mold surface as in examples of the prior art.

What is claimed is:

The process of manufacturing laminated sponge rubber and fabric articles having rounded edges, comprising forming a slab of rubber compounded to expand and form sponge rubber on vulcanization, laying a sheet of fabric over the slab, securing the edges of the fabric about the periphery of the rubber slab, placing the article within a closed chamber with the fabric out of contact with the walls thereof, and subjecting the slab to vulcanizing temperature for a sufficient period to cause the rubber to expand and to stretch the fabric during vulcanization over its entire surface and allowing the fabric to assume a natural curvature about the edges of the slab while the fabric about the edges of the slab is out of contact with the walls of the chamber.

MELVIN S. LOWER.